(12) United States Patent
Adrian et al.

(10) Patent No.: US 10,810,600 B2
(45) Date of Patent: Oct. 20, 2020

(54) USING MULTI-FACTOR CONTEXT FOR RESOLVING CUSTOMER SERVICE ISSUES

(71) Applicant: BMC SOFTWARE, INC., Houston, TX (US)

(72) Inventors: Thomas L. Adrian, Dublin, CA (US); Cedric Young, Markham (CA); Peter Adams, San Jose, CA (US); Jek-Sun Wong, Brooklin (CA); Sun Chun Chu, Richmond Hill (CA); Dinesh Elaprolu, Fremont, CA (US); Brian Zaik, San Jose, CA (US); Sameer Mardhekar, Pune (IN)

(73) Assignee: BMC Software, Inc., Houston, TX (US)

( * ) Notice: Subject to any disclaimer, the term of this patent is extended or adjusted under 35 U.S.C. 154(b) by 500 days.

(21) Appl. No.: 15/175,711

(22) Filed: Jun. 7, 2016

(65) Prior Publication Data

US 2017/0178145 A1    Jun. 22, 2017

Related U.S. Application Data

(60) Provisional application No. 62/268,317, filed on Dec. 16, 2015.

(51) Int. Cl.
*G06Q 30/00* (2012.01)
*G06F 16/9535* (2019.01)

(52) U.S. Cl.
CPC ....... *G06Q 30/016* (2013.01); *G06F 16/9535* (2019.01)

(58) Field of Classification Search
None
See application file for complete search history.

(56) References Cited

U.S. PATENT DOCUMENTS

| | | | |
|---|---|---|---|
| 9,317,829 B2 * | 4/2016 | Anand | G06Q 10/0635 |
| 2007/0168874 A1 * | 7/2007 | Kloeffer | G06F 8/65 |
| | | | 715/764 |

(Continued)

OTHER PUBLICATIONS

Oracle Knowledge for Contact Center and Siebel Contact Center, Oracle, 2011, 3 pages.

(Continued)

*Primary Examiner* — Dennis W Ruhl
(74) *Attorney, Agent, or Firm* — Brake Hughes Bellermann LLP (57) ABSTRACT

In a general aspect, a system can include a user interface with at least one input field for receiving input associated with an information technology (IT) customer service issue and a response area for displaying results in response to the input. The system can further include a context generation engine that receives the input associated with the IT customer service issue from the user interface and determines, based on the input, a multi-factor context. The system can also include a relevance-based search engine configured to search, based on the multi-factor context, a plurality of resources; assign, based on the multi-factor context, a respective relevancy score to each of the plurality of resources; and provide, to the user interface for display in the results area, a ranked list of a subset of the plurality of resources that is ordered based on the respective relevancy scores of the subset of the resources.

19 Claims, 5 Drawing Sheets

(56) References Cited

U.S. PATENT DOCUMENTS

| | | | |
|---|---|---|---|
| 2010/0057677 A1* | 3/2010 | Rapp | G06F 11/0709 |
| | | | 707/E17.014 |
| 2010/0082620 A1* | 4/2010 | Jennings, III | G06F 17/30598 |
| | | | 707/736 |
| 2011/0054964 A1* | 3/2011 | Anand | G06F 11/3006 |
| | | | 714/57 |
| 2011/0055699 A1* | 3/2011 | Li | G06F 17/30864 |
| | | | 715/709 |
| 2012/0066547 A1* | 3/2012 | Gilbert | H04L 41/065 |
| | | | 714/26 |
| 2014/0129536 A1* | 5/2014 | Anand | G06Q 10/0635 |
| | | | 707/706 |

OTHER PUBLICATIONS

Siebel Service, Oracle, 2013, 4 pages.
Oracle Knowledge 8.5 Release Product Summary Overview, Oracle, 2012, 10 pages., 2016.
"Smart IT and MyIT spark an IT service management transformation", BMC Software, Inc., retrieved from http://newsroom.bmc.com/phoenix.zhtml?c=253321&p=irol-newsArticle&ID=1976050, 2014, 3 pages.

* cited by examiner

USING MULTI-FACTOR CONTEXT FOR RESOLVING CUSTOMER SERVICE ISSUES

RELATED APPLICATION

This application claims priority to and the benefit of U.S. Application No. 62/268,317, filed Dec. 16, 2015, entitled "Using Multi-Factor Context for Resolving Customer Service Issues", which is hereby incorporated by reference in its entirety.

TECHNICAL FIELD

This description relates to approaches for resolving information technology (IT) customer service issues.

BACKGROUND

One problem faced by information technology (IT) service professionals (e.g., call center agents, technicians, engineers, etc.) is that information, tools and other resources (which can be referred to collectively as resources, electronic resources, etc.) for resolving IT service issues for customers and/or clients can be located in many different places. As a result, the process of locating those resources that are helpful for resolving a specific IT customer service issue can be inefficient for an IT service professional, or professionals, during a process of working on resolving that issue.

SUMMARY

In one general aspect, a system can include a user interface implemented on a first computing device. The user interface can include at least one input field configured to receive input associated with an information technology (IT) customer service issue and a response area for displaying results in response to the input associated with the IT customer service issue. The system can further include a context generation engine implemented on the first computing device. The context generation engine can be configured to receive the input associated with the IT customer service issue from the user interface and determine, in response to the input, a multi-factor context for the IT customer service issue. The system can further include a relevance-based search engine implemented on the first computing device. The relevance-based search engine can be configured to search, based on the multi-factor context, a plurality of resources, at least one resource of the plurality of resources being located on a second computing device; assign, based on the multi-factor context, a respective relevancy score to each of the plurality of resources; and provide, to the user interface for display in the results area, a ranked list of a subset of the plurality of resources, the ranked list being ordered based on the respective relevancy scores of the subset of the resources.

Implementations may include one or more of the following features. For example, the user interface can be configured to receive a selection of a resource of the subset of the plurality of resources displayed in the results area and, in response to the selection, access and display the selected resource and update the multi-factor context to indicate selection of the selected resource. The respective relevancy score for the selected resource can be based on a number of times the selected resource has been accessed. The number of times the selected resource has been accessed can be incremented in response to the selected resource being accessed.

The system can include a content configuration engine configured to receive configuration information for the plurality of resources. The configuration information can be used to determine whether to allow or deny access to each of the plurality of resources based on the multi-factor context. Denying access to a resource of the plurality of resources can include preventing the resource from being included in the ranked list of the subset of the plurality of resources.

The multi-factor context can include one or more of customer context information; environment context information; and customer service process context information. The relevance-based search engine can be further configured to, based on the multi-factor context perform a multi-form search of two or more respective resources of the plurality of resources and perform a full text search of at least one resource of the plurality of resources. Performing the multi-form search can include populating respective search interfaces for the two or more resources.

The subset of the plurality of resources can include one or more of an open customer service ticket, a closed customer service ticket, a work order, a change request, a knowledge article, an Internet search engine result, a request template, an identity of a person, a custom configured resource and an IT customer service tool.

In another general aspect, a computer-implemented method for identifying resources for resolving an IT customer service issue can include implementing a method by executing instructions stored on a non-transitory computer-readable storage medium. The method can include receiving input corresponding with the IT customer service issue and determining, based at least in part on the input, a multi-factor context for the IT customer service issue. The method can also include, searching, based on the multi-factor context, a plurality of resources and assigning, based on the multi-factor context, a respective relevancy score for each of the plurality of resources. The method can further include displaying, in a graphical user interface, a ranked list of a subset of the plurality of resources, the ranked list being ordered based on the respective relevancy scores of the subset of the resources.

Implementations may include one or more of the following features. For example, the input corresponding with the IT customer service issue can be a first input, the multi-factor context for the IT customer service issue can be a first multi-factor context and the subset of the plurality of resources can be a first subset. The method can include receiving second input corresponding with the IT customer service issue; modifying, based at least in part on the second input, the first multi-factor context for the IT customer service issue to determine a second multi-factor context for the IT customer issue; searching, based on the second multi-factor context, the plurality of resources; modifying, based on the second multi-factor context, at least one respective relevancy score of the plurality of resources; and displaying, in a graphical user interface, a ranked list of a second subset of the plurality of resources. The ranked list of the second subset of the plurality of resources can be ordered based on the modified respective relevancy scores of the second subset of the plurality of resources.

The respective relevancy score for a resource of the plurality of resources can be based on one or more of a frequency of occurrence of a search term included in the multi-factor context; a number of occurrences of the search term in the resource; and an amount of text in the resource. The respective relevancy score for the resource of the plurality of resources can be based on at least one of a data field of the resource in which the search term appears and a number of times the resource has been viewed.

The subset of the resources can include an IT customer service tool. The method can include automatically executing the IT customer service tool and adding an output of the IT customer service tool to the multi-factor context for the IT customer service issue.

The multi-factor context can include one or more of customer context information, environment context information, and customer service process context information. The customer context information can include one or more of a name of a customer associated with the IT customer service issue; a location of the customer; services associated with the customer; any open IT customer service tickets associated with the customer; and any closed IT customer service tickets associated with the customer. The environment context information can include one or more of: current known IT customer service issues; change requests for IT services; a product associated with the IT customer service issue; and a service associated with the IT customer service issue. The customer service process context information can include one or more of a role of an IT customer service agent working on the IT customer service issue and an indication of a communication channel that is being used between the IT customer service agent and a customer associated with the IT customer service issue.

In another general aspect, a computer program product tangibly embodied on a non-transitory computer-readable storage medium can include executable code that, when executed, can be configured to cause at least one processor to receive input corresponding with the IT customer service issue; determine, based at least in part on the input, a multi-factor context for the IT customer service issue; search, based on the multi-factor context, a plurality of resources; assign, based on the multi-factor context, a respective relevancy score to each of the plurality of resources; and display, in a graphical user interface, a ranked list of a subset of the plurality of resources, the ranked list being ordered based on the respective relevancy scores of the subset of the resources.

Implementations may include one or more of the following features. For example, the input corresponding with the IT customer service issue can be a first input, the multi-factor context for the IT customer service issue can be a first multi-factor context and the subset of the plurality of resources can be a first subset. The computer program product can include executable code that, when executed, can be configured to cause the at least one processor to receive second input corresponding with the IT customer service issue; modify, based at least in part on the second input, the first multi-factor context for the IT customer service issue to determine a second multi-factor context for the IT customer issue; search, based on the second multi-factor context, the plurality of resources; modify, based on the second multi-factor context, at least one respective relevancy score of the plurality of resources; and display, in a graphical user interface, a ranked list of a second subset of the plurality of resources, the ranked list of the second subset plurality of resources being ordered based on the modified respective relevancy scores of the second subset of the plurality of resources.

DETAILED DESCRIPTION

This document describes systems and techniques that can be used to make the process of identifying relevant resources (e.g., tools, information, people, etc.) for resolving information technology (IT) customer service issues more efficient for IT customer service professionals (e.g., call center representatives, technicians, engineers, etc.). The systems and techniques described herein are implemented using a multi-factor context to search a set of available resources to proactively identify resources that are potentially relevant to resolving an IT customer service issue associated with (characterized by) the multi-factor context. In the approaches described herein, a multi-factor context can be dynamically updated throughout the process of resolving the associated IT customer service issue. As the multi-factor context is updated (e.g., modified, etc.), the relevant resources identified can change as well by conducting additional (iterative) searches of the set of available resources.

In the approaches described herein, a system used to implement a multi-factor context based search for relevant resources can "learn" about the context of an associated IT customer service issue, such as in response to an IT customer service professional providing information on the issue, taking actions to resolve the issue, etc. By way of example, a multi-factor context associated with a given IT customer service issue can include information from a number of different sources, such as a description of the issue in a customer service ticket, a status of the ticket (e.g., new, in-process, partially resolved, etc.), a location of a customer or customers experiencing the issue, applications effected, services effected, configuration items effected, and so forth.

As a brief example, during the process of resolving a customer service issue, an IT customer service agent (IT customer service professional) may work with a customer on the phone. Using the approaches described herein, that information may be included as part of an associated multi-factor context. Additionally, information about the customer, what current IT customer service issues are currently occurring in his or her area, the description that the agent enters for the issue, and so forth, may be included in the multi-factor context that is used to identify relevant resources when searching across a wide variety of content and return a set of resources that are relevant to resolving the given customer service issue being addressed.

Examples of content that can be searched include knowledge articles, other incidents (e.g., open and/or closed support tickets), change requests for relevant computing resources, tasks in process by other customer service agents, work orders, etc. that may provide relevant details to assist in solving the customer service issue. The approaches described herein can also be used to proactively suggest and/or execute tools (e.g., diagnostic programs, support scripts, etc.) to assist in resolving the particular customer service issue. For instance, if a customer service agent enters a description of a customer service issue related to resetting a password, the approaches described herein may include that information in a multi-factor context and search a set of available resources based on that multi-factor context can be used to identify and suggest a tool (e.g., included in a repository of IT customer service tools) that the customer service agent can run to update and/or reset a customer's password.

In another example, if a customer service agent enters a description of problem that relates to database connectivity, the approaches described herein can be used to identify and suggest a database utility based on the problem description, an identify of the customer, the type of database the customer is using and the location where the issue is occurring (e.g., from an associated multi-factor context). In addition to identifying the database utility, other resources can also be identified, such as other incidents (e.g., open customer service tickets), current service outages, etc. that are potentially related to the customer's database connectivity issue.

The approaches described herein can be used to locate resources that are internal to an IT support center's computing resources, as well as resources that external to the IT support center. For instance, resources relevant resolving a particular issue can be located on external websites (e.g., technical society websites, academic sites, etc.), included in Internet search results, etc. Using the approaches described herein, a multi-factor context can be used to identify such external resources and return suggestions of resources that are relevant to resolving a particular IT customer service issue whether those resources are internally or externally located.

Using the approaches described herein, a multi-factor context can also be used to help an IT customer service professional identify other groups and/or individuals that may be able to resolve (or help resolve) a particular IT customer service issue. In a similar manner as suggesting relevant tools, the systems and techniques described herein can be used suggest people or groups who can be contacted to provide more details about resolving a customer service issue corresponding with a given multi-factor context.

As an example, if a customer is having an issue indexing a particular database type, a multi-factor, relevance-based search performed in accordance with the approaches described herein can be used to identify groups and/or individuals who have worked on indexing the particular database type in the past (e.g., from resolved customer support tickets), or to identify individuals that have authored knowledge articles on indexing databases of that type. The suggestions provided to an IT customer service professional can be further based on how well a group or individual has solved similar problems, such as from knowledge article ratings, customer service survey ratings, etc. Said another way, relevance of a particular resource (e.g., article, person, group, etc.) can be determined based on such ratings.

Based on respective relevance scores of searched resources, which can be determined (assigned, etc.) using the approaches described below, a ranked set of relevant resources (e.g., articles, web search results, service request templates, identification of groups or individuals, etc.) can be provided to an IT customer service professional working on resolving a given IT customer service issue. The ranked set of relevant resources can be determined by a relevance-based search that is based on a multi-factor context corresponding with the IT customer service issue.

Figure 1:
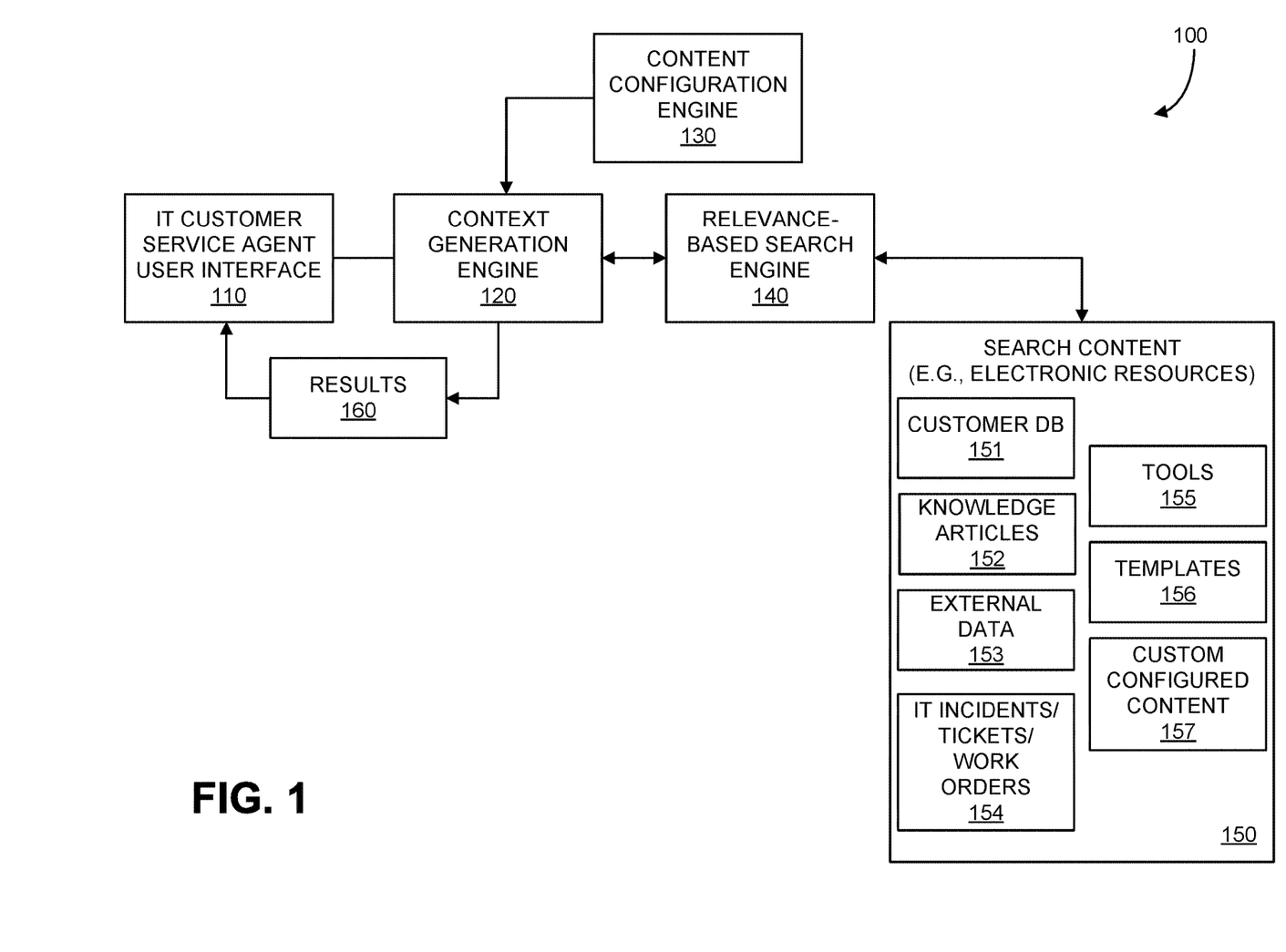
FIG. 1 is a block diagram illustrating a system for using a multi-factor context to resolve information technology (IT) customer service issues, according to an implementation.

FIG. 1 is a block diagram illustrating a system 100 for using a multi-factor context to resolve information technology (IT) customer service issues, according to an implementation. As shown in FIG. 1, the system 100 can include an IT customer service agent user interface (UI) 100, a context generation engine 120, a content configuration engine 130, a relevance-based search engine 140 and search content (resources) 150. In the system 100, results 160 (e.g., relevant resources identified based on a given multi-factor context) can be provided to the UI 100 (e.g., by the content generation engine 120) for display and/or selection by an IT customer service professional. In other implementations, the results 160 could be provided to the UI 100 by other components of the system 100.

Figure 2:
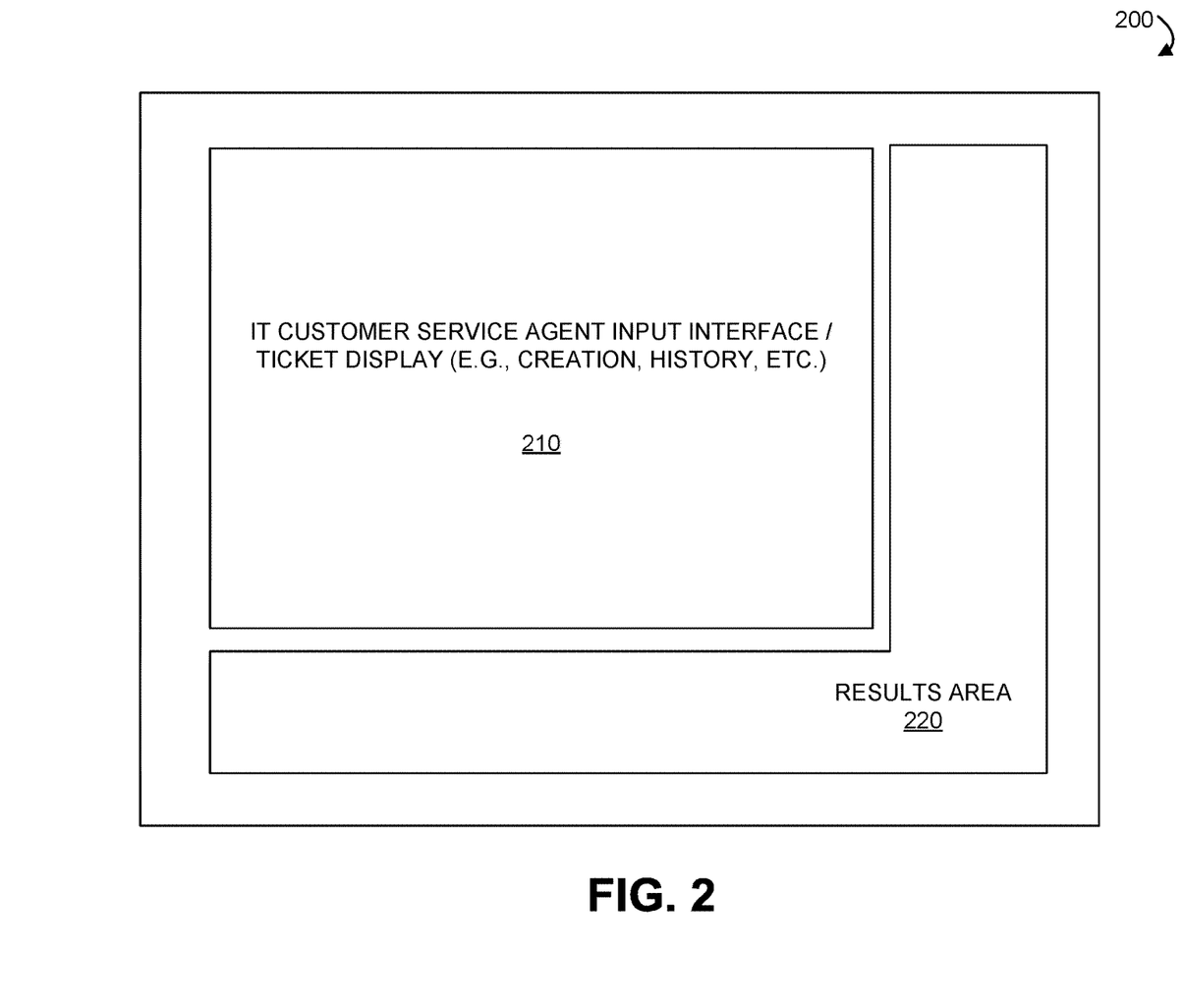
FIG. 2 is block diagram illustrating a user interface that can be implemented by the system of FIG. 1, according to an implementation.
Figure 3:
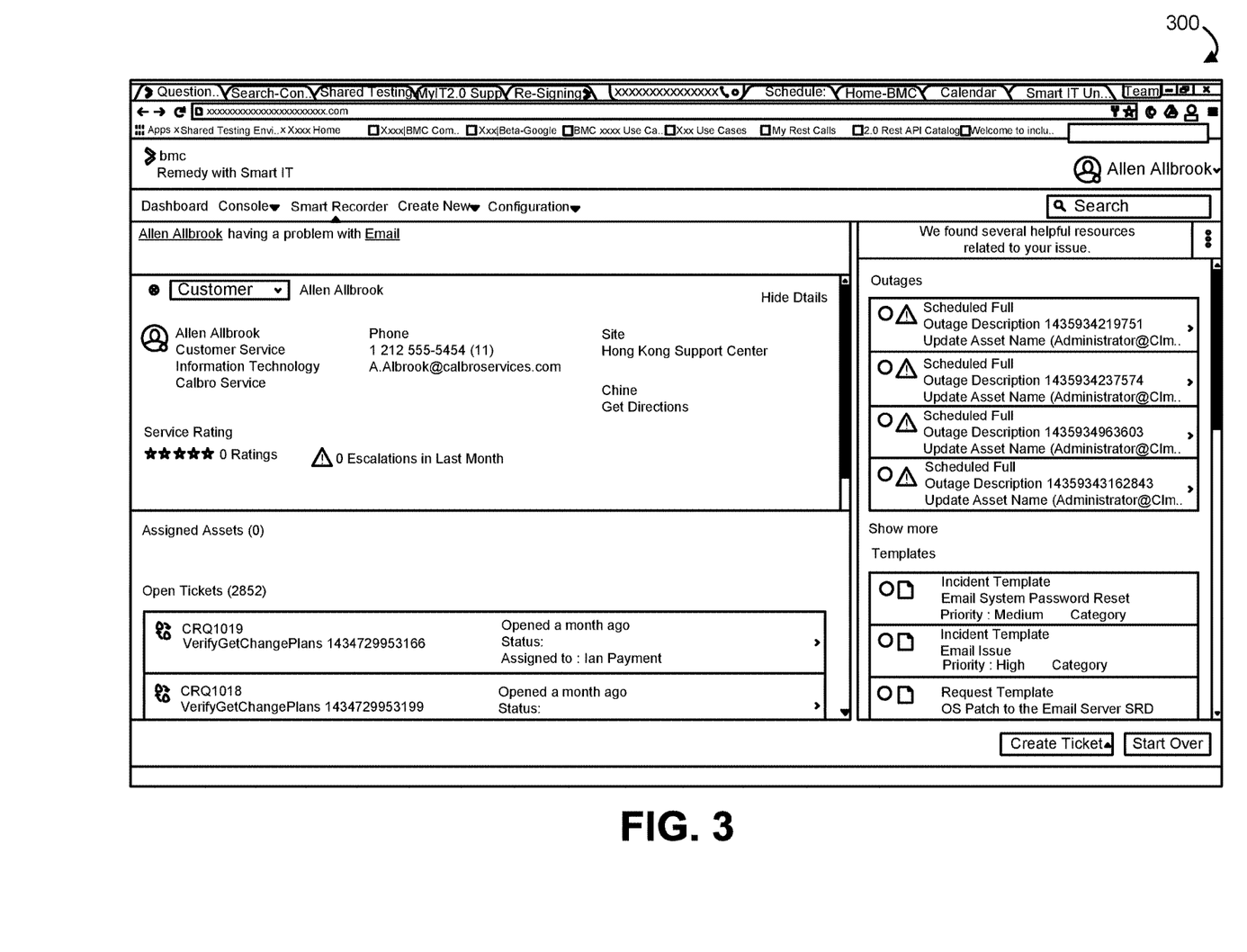
FIG. 3 is a diagram of a screen shot illustrating a user interface that can be implemented by the system of FIG. 1, according to an implementation.
Figure 4:
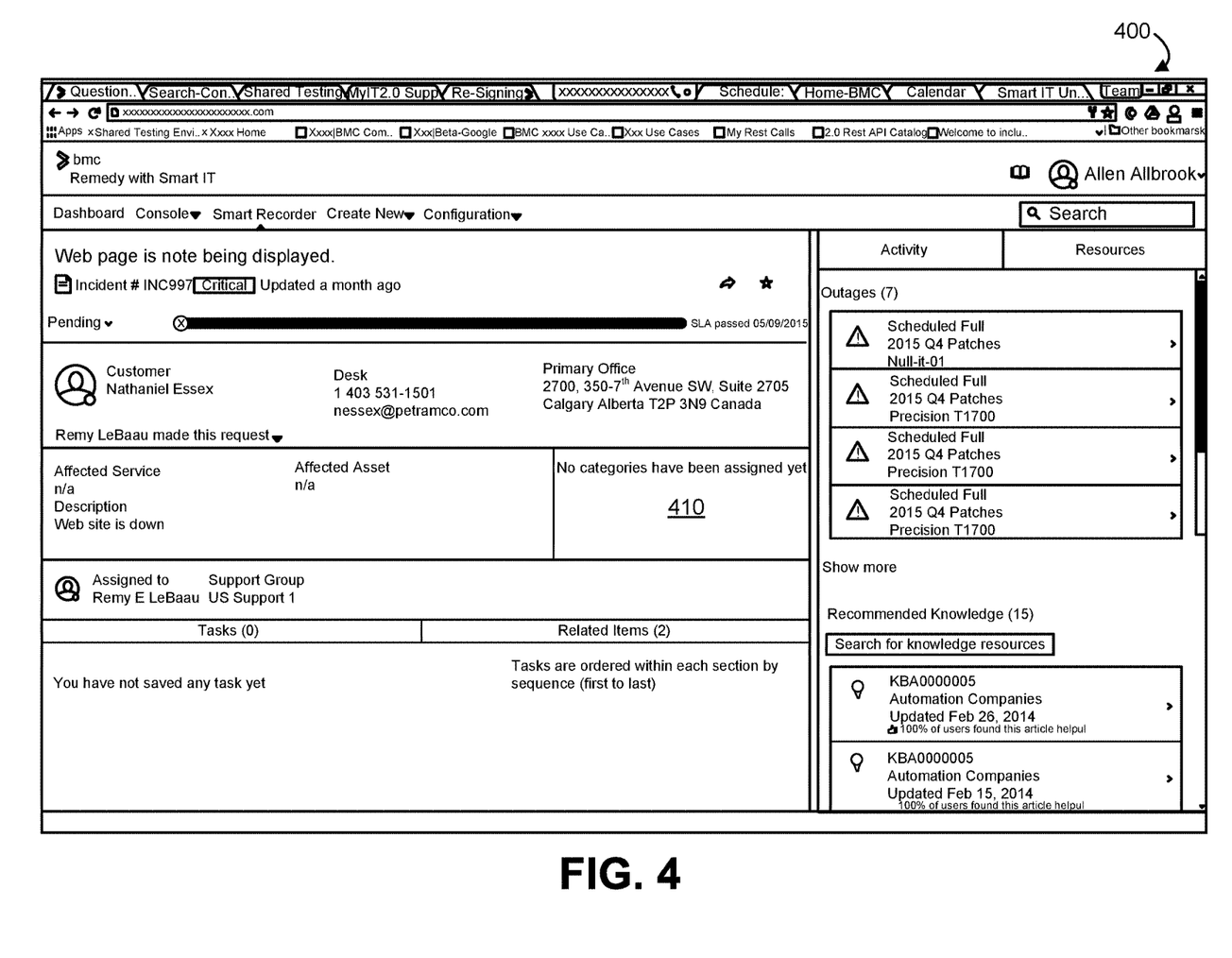
FIG. 4 is a diagram of a screen shot illustrating a user interface that can be implemented by the system of FIG. 1, according to an implementation.

Example implementations of the UI 110 are illustrated in FIG. 2-4 and described in further detail below. Briefly, however, the UI 110 of the system 100 can be implemented on a first computing device (or on multiple computing devices). The UI 110 can include at least one input field that is configured to receive input associated with an IT customer service issue, such as information entered by an IT customer service professional. The UI 110 can also include a response area configured to display results (e.g., results from a relevance-based resource search using a multi-factor context associated with the IT customer service issue), where the results are displayed, at least in part, in response to the input associated with the IT customer service issue.

In the system 100, the context generation engine 120 can be implemented on the first computing device. In other implementations, the context generation engine 120 can be implemented on a second computing device that is operatively coupled with the first computing device, or can be implemented on multiple computing devices. Of course, other configurations are also possible.

In this example implementation, the context generation engine 120 can be configured to receive the input associated with the IT customer service issue from the user interface and determine, in response to at least that input, a multi-factor context for the IT customer service issue. The multi-factor context can include customer context information, environment context information and/or customer service process context information. Depending on the particular implementation or situation, other context information and/or different context information can be included.

Context information included a given multi-factor context can be obtained from different sources. For instance, such context information can be obtained from information input by an IT customer service professional. Context information can also be obtained from information included in the system 100, or included in other systems or devices that are operationally coupled with the system 100 (e.g., such as a customer information database 151 included in the search content 150 in the system 100). The particular arrangement of information that can be included in a multi-factor context will depend on the particular implementation.

In one implementation, customer context information can include a name of a customer associated with the IT customer service issue, a location of the customer, products and/or services associated with (e.g., subscribed to by) the customer, any open IT customer service tickets associated with the customer and/or any closed IT customer service tickets associated with the customer. Of course, in other implementations, customer context information can include different and/or additional information than the foregoing examples. In other implementations, context information may be referred to generally, rather than as being customer context information, environment context information, customer service process context information, etc. In still other implementations, other classifications of context information can be used.

In the above example, the environment context information can include current known IT customer service issues, change requests for IT services, a product associated with the IT customer service issue and/or a service associated with the IT customer service issue, as some examples. As with the customer context information, environment context information can be obtained from information input by an IT customer service professional, obtained from information included in the system 100, or obtained from other systems or devices that are operationally coupled with the system 100.

Further in the above-example, the customer service process context information can include a role of an IT customer service agent working on the IT customer service issue (e.g., front-end agent, back-end agent/technician, engineer, etc.), a status of an associated customer service ticket and/or an indication of a communication channel that is being used between the IT customer service agent and a customer associated with the IT customer service issue (e.g., telephone, online chat, email, etc.). As with the customer context information and the environment context information, the customer service process context information can be obtained from information input by an IT customer service professional, based on a login ID of the IT customer service professional, obtained from information included in the system 100, or obtained from other systems or devices that are operationally coupled with the system 100.

In the system 100, the content configuration engine 130 can be configured to allow a user (e.g., a system administrator) to configure which content should be searched based on a given multi-factor context. For instance, if the given multi-factor context indicates that an associated IT customer service issue is related to email, the content configuration engine 130 may restrict a corresponding relevance-search for resources to those resources that are categorized as being related to email related issues. As another example, if the multi-factor context indicates that the agent working on a given issue is a front-end agent (e.g., a call center representative), the context configuration engine 130 may restrict resource searching to only those resources that are appropriate for that context (e.g., service request templates, open customer service tickets, etc.). Such content configuration information can allow for more efficient searching of the search content (e.g., as opposed to continually searching all search content 150).

In an implementation, the content configuration engine 130 can be configured to receive configuration information (e.g., from a system administrator) for a plurality of resources (e.g., search content 150). This configuration information can then being used to determine whether to allow or deny access to each of the plurality of resources based on the multi-factor context, such as described above. In this example, denying access to one or more resources of the plurality of resources in the search content 150 can include preventing that resource from being included in a ranked list of the subset of the plurality of resources that are provided to an IT customer service agent as being relevant to an IT customer service associated with a given multi-factor context (e.g., the results 160). Further, the content configuration engine 130 can also be used to produce (generate, create, build, etc.) and/or manage custom configured content 157, such as databases, database objects, repositories, etc., that can be included in the search content 150.

In the system 100, the relevance-based search engine 140 can be implemented on the first computing device, on another computing device that is operationally coupled with the first computing device (e.g., that is used to implement the UI 110) or on multiple computing devices. The relevance-based search engine 140 can be configured to search the search content 150 (e.g., a plurality of resources) based on a given multi-factor context and content configuration information that can be included in the content configuration engine 130. In implementations, at least one resource of the plurality of resources included in the search context 150 can be located on a second computing device, such as on an external website, a technology website, in an external database, etc.

The relevance-based search engine 140 can also be configured to assign, based on the multi-factor context, a respective relevancy score to each of the plurality of resources that are search in the search content 150 and provide the results 160 (which can be a ranked list of a subset of the plurality of resources that is determined to be relevant to the particular IT customer service issue associated with the multi-factor context) to the UI 110 for display and/or selection. The ranked list of the results 160 can be ordered based on the respective relevancy scores of the subset of the resources. Example approaches for assigning relevancy scores are described in further detail below.

In an implementation, the relevance-based search engine 140 can be configured to, based on a given multi-factor context, perform a multi-form search of two or more respective resources of a plurality of resources in the search content 150 and/or perform a full text search of at least one resource of the plurality of resources in the search content 150. For instance, performing the multi-form search can include populating respective search interfaces for the two or more resources.

As shown in FIG. 150, the subset of the plurality of resources included in the results 160 can be one or more of an open customer service ticket, a closed customer service ticket, and/or a work order a change request, such as may be included in an IT incidents/tickets/work orders repository 154. The results 160 can also include one or more knowledge articles from a knowledge articles repository 152, a website identified using an Internet search engine on external data 153, an IT customer service tool included in a tools repository 155, an IT service request template included in a templates repository 156, an identity of a person such as an author or a relevant knowledge article and/or a custom configured resource from custom configured content 157.

In some implementations, if the results 160 include an IT customer service tool, the system 100 can be configured to automatically execute that IT customer service tool. In other implementations, the results 160 can include an action button to launch the IT customer service tool. In some instances, an output of an executed IT customer service tool can be added to the multi-factor context for the IT customer service issue, which can help refine the relevancy of the results 160 (e.g., by performing an updated (iterative) search based on the modified multi-factor context using the relevance-based search engine 140).

In implementations, the system 100 can use a number of approaches to gather context information and identify relevant resources to include in the results 160. As discussed above, the system 100 can provide the capability for full text and multi-form searches. The system 100 can also be configured to index both internal and external search content 150. For example, resources of the search content 150 can be represented by and/or included in database objects in the system 100 with various data fields that will depend on the particular resource. Such database objects can then be readily indexed by a database application included in the system 100.

The system 100 (e.g. the relevance-based search engine 140 and/or the search content 150) can be configured to track integration of tools included in the tools repository 150 to different systems, services and products, and then index those tools as they are used to resolve (or attempt to resolve) particular IT customer service issues. This indexing information can then be used to proactively suggest these tools in response to multi-factor context-based searches and can also provide additional context information for multi-factor contexts (e.g., context information regarding the relevance of the tools 155 for resolving particular IT customer service issues). Relevancy scores for the tools 155 can be weighted based on how often given tools are used to solve particular problems, as well as other factors, such as if customer service tickets on particular issues remain open after using a given tool and survey information that reflects a given tool's effectiveness in solving particular problems.

The system 100 can also be configured to efficiently identify collaboration targets (e.g., people or groups that are considered experts, or are knowledgeable in particular areas) as relevant resources (e.g., in the results 160). The system 100 can be configured to proactively build a model (e.g., a data model) that identifies people or groups that are knowledgeable on different topics, such as by using the results of IT customer service tickets they have solved on similar issues, as well as ratings on knowledge articles they have authored. Such information can be used to proactively provide identities of such people or groups to an IT customer service professional that is working to solve a particular problem as part of the results 160.

FIG. 2 is block diagram illustrating a user interface (UI) 200 that can be implemented by the system 100 of FIG. 1, according to an implementation. In example implementations, the UI 200 can be implemented as the UI 110 of the system 100. Accordingly, for purposes of illustration, the UI 200 will be described with further reference to FIG. 1, though other arrangements are possible.

As shown in FIG. 2, the UI 200 includes an IT customer service agent input interface/ticket display area (agent interface) 210 and a results area 220. In the system 100, the UI 200 can be configured to receive input from an IT customer service professional in the agent interface 210 and also configured to receive a selection of a resource of the results 160 from a relevance-based search that is performed by the relevance-based search engine 140, where that search is based on a given multi-factor context. In this example, the result 160 can be displayed in the results area 220 of the UI 200. In response to such a resource selection, the system 100 can be configured to access and display the selected resource (e.g., in the agent interface 210). The system 100 can also be configured to, in response to the selection, update the associated multi-factor context to indicate selection of the selected resource. Further, the system 100 can be configured to increase an access count associated with the resource, (e.g., a number of times the resource has been accessed to address similar customer service issues) where that access count can be used to weight relevancy scores, such as in the approaches described herein.

FIG. 3 is a diagram of a screen shot illustrating a user interface 300 that can be implemented by the system 100 of FIG. 1, according to an implementation. As with the UI 200, the UI 300 can be implemented as the UI 110 of the system 100. Accordingly, for purposes of illustration, the UI 300 will be described with further reference to FIG. 1, though other arrangements are possible.

In the system 100, an agent interface 310 of the UI 300 can be used by an IT customer service professional to enter information regarding a customer service issue and/or to display information regarding the status customer service issue (e.g., a current status of an associated customer support ticket), or other customer service issue resolution information. The UI 300 also includes a results area 320 that can be used to display the results 160 from a relevance-based search that is performed based on an associated multi-factor context for the corresponding customer service issue. As shown in FIG. 3, the results area 320 includes links for open tickets, outages and templates that can be used by the IT customer service professional to address the associated customer service issue. In other implementations, other resources may be represented in the results 160 shown in the results area 320 in FIG. 3, such as action buttons to launch relevant tools 155 identified in the results 160.

In an example implementation, a front line customer service agent (e.g., a call center representative) can enter information regarding a customer service issue into the agent interface 310. For instance, the agent may enter a customer's name and a brief description of the issue the customer is experiencing. The system 100 will understand the context of this being a front line agent query, include that context information in a corresponding multi-factor context and begin a search (e.g., with the relevance-based search engine 140) for content of the search content 150 that the agent can use in attempting to resolve the customer service issue. Additionally, other context information can be taken into account in that search. The context information can include a location of the customer, services the customer is subscribed to, as well as where the customer service agent is in the process of resolving the issue.

In the system 100, a description of the problem entered by the customer service agent can reduce the scope of an associated search (and make that search more efficient). As an example, if the customer service agent types in information such as "Allen Allbrook is having a problem with his email. He cannot connect to the email server when he is working in the San Jose office" the following actions can take place.

A multi-factor context can be generated where the included context information can indicate that Allen Allbrook is the customer, his email service is affected, his email application may be the product affected and his location is San Jose. The relevance-based search engine 140 can then use this multi-factor context to search the search content 150 to identify relevant resources (e.g., the results 160) for resolving the email issue. These resources can include knowledge articles, other tickets open on the same problem at the same site, change requests that may have been recently implemented that, based on their relationship to the email service, could be the cause of the customer's problem, and/or tools 155, such as email server utilities and/or remote desktop utilities and that the agent can run to help solve the problem.

Tools 155 that are identified as relevant can be automatically configured by the system 100 (e.g., using information from the multi-factor context) to connect to the customer's desktop or device, and/or to the customer's email program. The results 160 can also include resources that are relevant to the email issue that are identified by external searches, such as technical bulletins on the email service that may be published by a corresponding producer of the email server hardware and/or software.

In implementations, if the customer service agent selects any of the results 160 as part of their investigation and resolution of the problem, those selections can be tracked (e.g., using access counts), where the tracked information can be used to weight the relevancy score of the selected result 160 for resolving future similar problems. In some implementations, after resolution of the problem, the customer service agent can be automatically prompted to author a knowledge article documenting the actions taken to resolve the problem. That knowledge article could then be provided as a relevant result for customer service agents that are working on resolving similar problems in the future.

FIG. 4 is a diagram of a screen shot illustrating a user interface 400 that can be implemented by the system of FIG. 1, according to an implementation. In an implementation, the user interface 400 can be a modification of the user interface 300 shown in FIG. 3, such as after iteration/modification of an associated multi-factor context. The multi-factor context could be modified (iterated) based on additional information provided by a customer service agent, by assignment of an associated ticket to a service, occurrence of related incidents (e.g., other similar tickets), and so forth.

Figure 5:
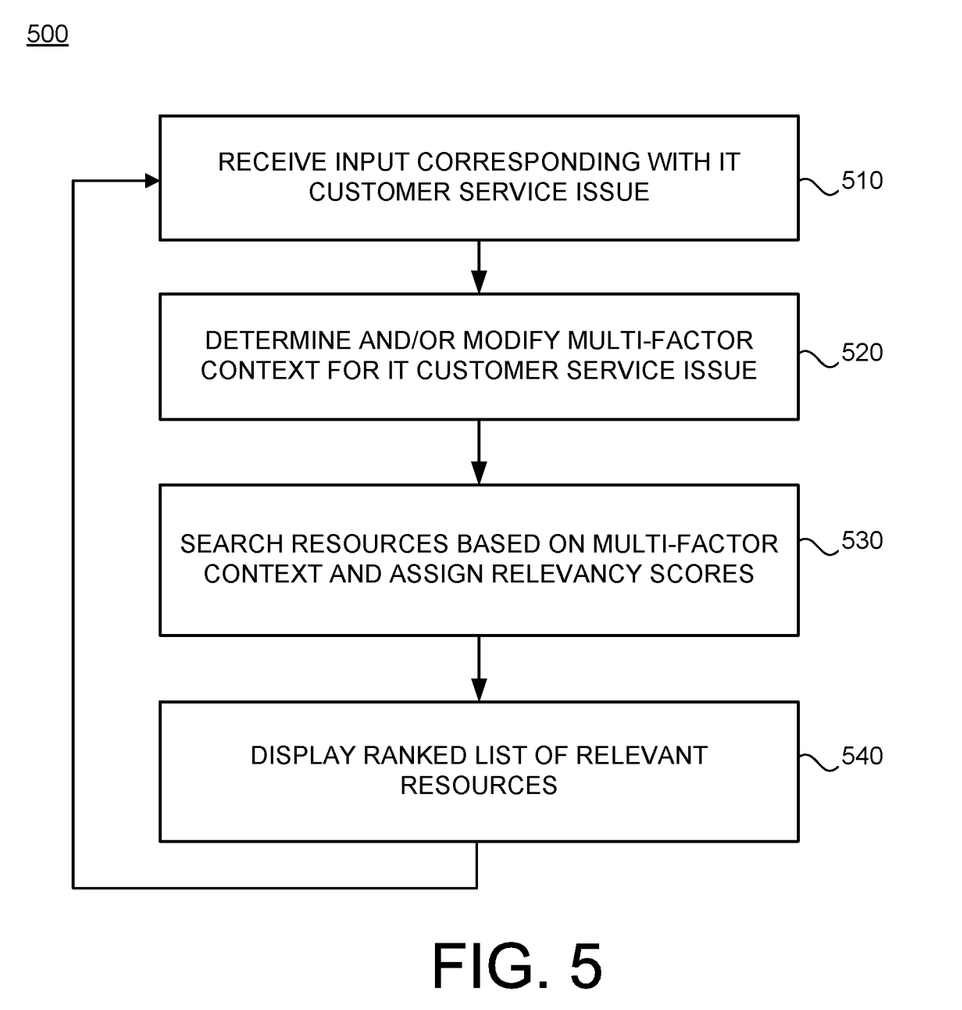
FIG. 5 is a flowchart illustrating example operations of the system of FIG. 1, according to an implementation.

The user interface 400 can be generated using the approaches described herein. However, because the multi-factor context may be different, the respective relevancy-ranked results can be different. Factors that can effect the specific relevancy ranked search results provided can vary based on the particular implementation. For instance, a point that an associated customer service ticket is in the resolution process can have a significant effect on the multi-factor context and the associated relevancy-ranked results provided in the user interface 500. For example, if an associated customer service ticket is assigned to a backline service technician, the tools (or other resources) suggested can be specifically targeted to backline issue resolution (e.g., more appropriate for a service technician). In other words, different resources can be suggested at different points in the issue resolution process. For instance, if a customer service agent is in a problem management process, the suggested tools could be more focused on problem management, while if the customer service agent is working as part of an incident (e.g., outage) process, then tools focused on determining a work around to get affected customers "up and running" quickly (e.g., to implement, at least, a temporary fix) can be suggested.

FIG. 5 is a flowchart illustrating a method 500 that can be implemented in the system 100 of FIG. 1, according to an implementation. For purposes of illustration, the method 500 will be described with further reference to FIGS. 1-4, as appropriate. It will be appreciated, however, that the method 500 can be implemented in systems having configurations other than that of the system 100, and can include UIs having different configurations than those shown in FIGS. 2-4.

The method 500 (which can be a computer-implemented method) can be used to efficiently and proactively identify resources in the search content 150 that are relevant for resolving given information technology (IT) customer service issues. As noted above, the method 500 can be a computer-implemented method, which is performed by executing instructions stored on a non-transitory computer-readable storage medium. Further, as indicated above and shown in FIG. 5, the method 500 can be performed iteratively as additional context information is added to a corresponding multi-factor context. Such an approach can continually improve and/or update the relevancy of the results 160 provided to an IT customer service agent for resolving a particular problem as more detailed context information is obtained (e.g., as the resolution process progresses).

As shown in FIG. 5, the method 500 can include, at block 510, receiving input corresponding with an IT customer service issue. The input at block 510 can include input from a number of sources. For instance, the input at block 520 can include information about an IT customer service issue IT that is entered by a customer service agent in the agent interface 310, selection of a resource from the result 160, context information from other sources, etc. At block 520, the method 500 can include determining, modifying and/or updating, based at least in part on the input of block 510, a multi-factor context for the IT customer service issue.

In other words, context information for a given multi-factor context can be gathered in a number of different ways. For instance, as a customer service agent types in information regarding a given customer service issue in the agent interface 310, that entered information can be used to leverage other information in the system 100 to enhance a corresponding multi-factor context for the given customer service issue. As more information is entered, additional context can be added, such as using the approaches described herein.

At block 530, the relevance-based search engine 140 can perform a search of the search content 150 based on (in accordance with) a current multi-factor context. As described herein, as additional context information is added to the multi-tracker context, the relevance-based search engine 140 can continually/iteratively perform relevance-based searches of the search content 150 to refine (improve) the relevance of the results 160 presented (e.g., to a customer service agent working on the issue) in the results area 320 of the UI 300, or a results area of another UI, such as the results area 420 of the UI 400.

In an implementation, the relevance-based search engine 140 can initiate a multi-form search of the search content 150, where that search is performed in accordance with content configuration information provided by the content configuration engine 130. As described herein, relevancy of particular resources in the search content 150 for a given search can be based on respective uses counts usage counts for those resources. For instance, as content is accessed to resolve IT customer service issues, that accessed content may become more relevant for relevance-based searches for multi-factor contexts associated with similar future problems.

In implementations, customer service problem resolution process context (process context) can be based on such usage counts for resources of the search content 150. For instance, the system 100 can track when content is used and at what phase of the service process a corresponding search was done. Further, resources in the search content 150 can be configured to make them more relevant for a particular multi-factor context, such as for problems related to specific products and/or services, such as by including certain keywords in metadata or other fields of the resource.

Depending on the particular resource being search by the relevance-based search engine 140, different types of searches can be performed. For example, in an implementation, full text searches can be performed on resources included in the IT incidents/tickets/work order repository 154 and on knowledge articles 152. Agent context information (or other context information) can be used to filter which resources of the search content 150 are searched for a search performed by the relevance-based search engine 140 for a given multi-factor context.

Also at block 530, the relevance-based search engine 140 can assign relevancy scores to each of the searched resources in the search content 150 and select a subset of the those search resources (based on their respective relevancy scores) to present as the results 160 for a given multi-factor context. For instance, the results 160 may include a predetermined number (e.g., with the highest relevancy scores) of a given type of resource in the search content 150. For example, the system 100 may be configured to only include five tools from the tools repository 155 in the results 160 for a given relevance-based search. The number of resources of each type included in the results 160 will depend, at least in part, on the particular implementation. Furthermore, the approach used for assigning respective relevancy scores can depend on the particular implementation.

In an example implementation, relevancy scores can be assigned and/or calculated based on a number of factors. For instance, relevancy scores can be based on a frequency of occurrence of given terms in a multi-factor context across searched resources of the search content 150. As an example, if the words "email" and "configuration" are included in a multi-factor context that is the basis of a search and the relevance-based search engine 140 determines that 8000 of 10000 searched resources include the word "email", but the word "configuration" is included in a smaller number of the search resources (e.g., 100), the term "configuration" can be considered to be more relevant than the term "email" for this particular multi-factor context.

As another example, relevancy scores can be based on a number of times a search term from a multi-factor context appears in a given resource. For instance, if the word "email" appears five times in a particular data field of a resource (e.g., an Abstract or Summary), that resource can be considered more relevant than another resource that might only contain the term "email" once.

As yet another example, the length of text included in a searched resource can be a factor when assigning relevancy scores. For instance, if a search term is found in a resource that contains a relatively small amount of text (e.g., as compared to other searched resources), that resource can be considered to be more relevant than a resource with a relatively greater amount of text.

In an example implementation, the factors discussed above can all be considered when assigning a relevancy score for a given searched resource. Further, for resources with multiple data fields (e.g., such as fields in a database object), relevancy scoring can be performed for every field of the resource using the approaches described herein. An aggregate relevancy score for a given resource can then be determined from the respective relevancy scores for the each of the resource's individual fields.

Other techniques can be used to influence/weight relevancy scores that are assigned to searched resources. For example, certain fields of a given resource can be assigned relevancy weights that can impact an aggregate relevancy score for the given resource. For instance, searches against certain fields of a given resource can be ranked higher than relevancy scores for other fields of that resource. Also, as discussed above, respective usage counts for resources of the search content 150 can be used to weight relevancy scores for particular multi-factor contexts.

Further, at block 540, the method 500 includes displaying, in a UI, such as the UIs 200, 300 and 400, a ranked list of a subset of the plurality of resources (e.g., the results 160). As described herein, the results 160 can being ordered based on the respective relevancy scores of the subset of the resources. Further, the number of resources of a particular type included in the results 160 can be limited to a given number of resources.

In one general aspect, a system can include a user interface implemented on a first computing device. The user interface can include at least one input field configured to receive input associated with an information technology (IT) customer service issue and a response area for displaying results in response to the input associated with the IT customer service issue. The system can further include a context generation engine implemented on the first computing device. The context generation engine can be configured to receive the input associated with the IT customer service issue from the user interface and determine, in response to the input, a multi-factor context for the IT customer service issue. The system can further include a relevance-based search engine implemented on the first computing device. The relevance-based search engine can be configured to search, based on the multi-factor context, a plurality of resources, at least one resource of the plurality of resources being located on a second computing device; assign, based on the multi-factor context, a respective relevancy score to each of the plurality of resources; and provide, to the user interface for display in the results area, a ranked list of a subset of the plurality of resources, the ranked list being ordered based on the respective relevancy scores of the subset of the resources.

Implementations may include one or more of the following features. For example, the user interface can be configured to receive a selection of a resource of the subset of the plurality of resources displayed in the results area and, in response to the selection, access and display the selected resource and update the multi-factor context to indicate selection of the selected resource. The respective relevancy score for the selected resource can be based on a number of times the selected resource has been accessed. The number of times the selected resource has been accessed can be incremented in response to the selected resource being accessed.

The system can include a content configuration engine configured to receive configuration information for the plurality of resources. The configuration information can be used to determine whether to allow or deny access to each of the plurality of resources based on the multi-factor context. Denying access to a resource of the plurality of resources can include preventing the resource from being included in the ranked list of the subset of the plurality of resources.

The multi-factor context can include one or more of customer context information; environment context information; and customer service process context information. The relevance-based search engine can be further configured to, based on the multi-factor context perform a multi-form search of two or more respective resources of the plurality of resources and perform a full text search of at least one resource of the plurality of resources. Performing the multi-form search can include populating respective search interfaces for the two or more resources.

The subset of the plurality of resources can include one or more of an open customer service ticket, a closed customer service ticket, a work order, a change request, a knowledge article, an Internet search engine result, a request template, an identity of a person, a custom configured resource and an IT customer service tool.

In another general aspect, a computer-implemented method for identifying resources for resolving an IT customer service issue can include implementing a method by executing instructions stored on a non-transitory computer-readable storage medium. The method can include receiving input corresponding with the IT customer service issue and determining, based at least in part on the input, a multi-factor context for the IT customer service issue. The method can also include, searching, based on the multi-factor context, a plurality of resources and assigning, based on the multi-factor context, a respective relevancy score for each of the plurality of resources. The method can further include displaying, in a graphical user interface, a ranked list of a subset of the plurality of resources, the ranked list being ordered based on the respective relevancy scores of the subset of the resources.

Implementations may include one or more of the following features. For example, the input corresponding with the IT customer service issue can be a first input, the multi-factor context for the IT customer service issue can be a first multi-factor context and the subset of the plurality of resources can be a first subset. The method can include receiving second input corresponding with the IT customer service issue; modifying, based at least in part on the second input, the first multi-factor context for the IT customer service issue to determine a second multi-factor context for the IT customer issue; searching, based on the second multi-factor context, the plurality of resources; modifying, based on the second multi-factor context, at least one respective relevancy score of the plurality of resources; and displaying, in a graphical user interface, a ranked list of a second subset of the plurality of resources. The ranked list of the second subset of the plurality of resources can be ordered based on the modified respective relevancy scores of the second subset of the plurality of resources.

The respective relevancy score for a resource of the plurality of resources can be based on one or more of a frequency of occurrence of a search term included in the multi-factor context; a number of occurrences of the search term in the resource; and an amount of text in the resource. The respective relevancy score for the resource of the plurality of resources can be based on at least one of a data field of the resource in which the search term appears and a number of times the resource has been viewed.

The subset of the resources can include an IT customer service tool. The method can include automatically executing the IT customer service tool and adding an output of the IT customer service tool to the multi-factor context for the IT customer service issue.

The multi-factor context can include one or more of customer context information, environment context information and customer service process context information. The customer context information can include one or more of a name of a customer associated with the IT customer service issue; a location of the customer; services associated with the customer; any open IT customer service tickets associated with the customer; and any closed IT customer service tickets associated with the customer. The environment context information can include one or more of: current known IT customer service issues; change requests for IT services; a product associated with the IT customer service issue; and a service associated with the IT customer service issue. The customer service process context information can include one or more of a role of an IT customer service agent working on the IT customer service issue and an indication of a communication channel that is being used between the IT customer service agent and a customer associated with the IT customer service issue.

In another general aspect, a computer program product tangibly embodied on a non-transitory computer-readable storage medium can include executable code that, when executed, can be configured to cause at least one processor to receive input corresponding with the IT customer service issue; determine, based at least in part on the input, a multi-factor context for the IT customer service issue; search, based on the multi-factor context, a plurality of resources; assign, based on the multi-factor context, a respective relevancy score to each of the plurality of resources; and display, in a graphical user interface, a ranked list of a subset of the plurality of resources, the ranked list being ordered based on the respective relevancy scores of the subset of the resources.

Implementations may include one or more of the following features. For example, the input corresponding with the IT customer service issue can be a first input, the multi-factor context for the IT customer service issue can be a first multi-factor context and the subset of the plurality of resources can be a first subset. The computer program product can include executable code that, when executed, can be configured to cause the at least one processor to receive second input corresponding with the IT customer service issue; modify, based at least in part on the second input, the first multi-factor context for the IT customer service issue to determine a second multi-factor context for the IT customer issue; search, based on the second multi-factor context, the plurality of resources; modify, based on the second multi-factor context, at least one respective relevancy score of the plurality of resources; and display, in a graphical user interface, a ranked list of a second subset of the plurality of resources, the ranked list of the second subset plurality of resources being ordered based on the modified respective relevancy scores of the second subset of the plurality of resources.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

For example, the IT customer service user interface 110 may be implemented by any type of computing device that includes at least one processor, at least one non-transitory memory for storing instructions, including an application having instructions, that may be executed by the at least one processor to perform the functions described above. Similarly, the context generation engine 120, the content configuration engine 130 the relevance-search engine 140 and the search content 150 may be implemented on one or more computing devices that includes at least one processor, at least one non-transitory memory for storing instructions, including an application having instructions, that may be executed by the at least one processor to perform the functions described above.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system, comprising:
a processor; and
a memory, the processor and memory configured to implement:
a user interface on a computing device, wherein the user interface includes at least one input field configured to receive textual input associated with an information technology (IT) customer service issue, and a response area for displaying results;
a context generation engine configured to determine a multi-factor context for the IT customer service issue based on the received textual input;
a relevance-based search engine configured to search a plurality of resources listed in a search content to identify specific resources for resolving the IT customer service issue, the specific resources including a plurality of IT tools maintained using a tools index; and
a content configuration engine configured to, based on the textual input and the multi-factor context, restrict searching for the specific resources to only a limited portion of the search content, and identify the specific resources that are located at different places, the identified specific resources including the plurality of IT tools,
the relevance-based search engine being further configured to:
assign, based on the multi-factor context, a respective relevancy score to each of the identified specific resources that are located at different places;
select at least one of the plurality of IT tools, based on the tools index;
execute the at least one of the plurality of IT tools to obtain an executed output thereof;
as additional context information is added to the multi-factor context, including the executed output, iteratively perform relevance-based searches of the search content to refine the assigned relevancy score, and update the tools index based on a result of the executed output to reflect an effectiveness of the at least one of the plurality of IT tools in resolving the IT customer service issue; and
provide, on the user interface for display in the response area, a ranked list of the identified specific resources that are located at different places, the ranked list being ordered based on the respective relevancy scores of the identified specific resources;
an action button for launching at least one of the identified specific resources; and
a resolution of the IT customer service issue by launching at least one of the identified specific resources in the ranked list.

2. The system of claim 1, wherein the user interface is configured to,
in response to a selection of a resource displayed in the response area, access and display the selected resource, and update the multi-factor context to indicate selection of the selected resource.

3. The system of claim 2, wherein the respective relevancy score for the selected resource is based on a number of times the selected resource has been accessed and wherein the number of times the selected resource has been accessed is incremented each time the selected resource is accessed.

4. The system of claim 1, wherein the content configuration engine is further configured to:
receive configuration information for the plurality of resources, the configuration information being used to determine whether to allow or deny access to each of the plurality of resources based on the multi-factor context.

5. The system of claim 4, wherein denying access to a resource of the plurality of resources includes preventing the resource from being included in the ranked list of the subset of the plurality of resources.

6. The system of claim 1, wherein the multi-factor context includes one or more of customer context information, environment context information, and customer service process context information.

7. The system of claim 1, wherein the relevance-based search engine is further configured to, based on the multi-factor context, perform a multi-form search for two or more specific resources of the plurality of resources, wherein the multi-form search includes a full text search for at least one specific resource of the plurality of resources.

8. The system of claim 7, wherein performing the multi-form search includes populating respective search interfaces for the two or more resources.

9. The system of claim 1, wherein the different places the specific resources are located include one or more of:
an open customer service ticket;
a closed customer service ticket;
a work order;
a change request;
a knowledge article;
an Internet search engine result;
a request template;
an identity of a person;
a custom-configured resource; and
an IT customer service tool.

10. A computer-implemented method for identifying resources for resolving an information technology (IT) customer service issue, the computer-implemented method including implementing a method by executing instructions stored on a non-transitory computer-readable storage medium, the method comprising:
receiving textual input corresponding to the IT customer service issue;
determining, based at least in part on the textual input, a multi-factor context for the IT customer service issue;
searching a plurality of resources listed in a search content to identify specific resources for resolving the IT customer service issue, the specific resources including a plurality of IT tools maintained using a tools index, and the searching for the specific resources being restricted, based on the textual input and the multi-factor context, to only a limited portion of the search content, and identifying the specific resources that are located at different places, the identified specific resources including the plurality of IT tools;
assigning, based on the multi-factor context, a respective relevancy score for each of the identified specific resources that are located at different places;
selecting at least one of the plurality of IT tools, based on the tools index;
executing the at least one of the plurality of IT tools to obtain an executed output thereof;
as additional context information is added to the multi-factor context, including the executed output, iteratively searching the search content to refine the assigned relevancy score, and updating the tools index based on a result of the executed output to reflect an effectiveness of the at least one of the plurality of IT tools in resolving the IT customer service issue; and
displaying, in a graphical user interface,
a ranked list of the identified specific resources that are located at different places, the ranked list being ordered based on the respective relevancy scores of the identified specific resources, and an action button for launching at least one of the identified specific resources; and
resolving the IT customer service issue by launching the at least one of the identified specific resources in the ranked list.

11. The computer-implemented method of claim 10, wherein the textual input corresponding with the IT customer service issue is a first input, the multi-factor context for the IT customer service issue is a first multi-factor context, and the specific resources are a first subset of the plurality of resources, the method further comprising:
receiving a second input corresponding with the IT customer service issue;
modifying, based at least in part on the second input, the first multi-factor context for the IT customer service issue to determine a second multi-factor context for the IT customer issue;
searching, based on the second multi-factor context, the plurality of resources;
modifying, based on the second multi-factor context, at least one respective relevancy score of the plurality of resources; and
displaying, in a graphical user interface, a ranked list of a second subset of the plurality of resources, the ranked list of the second subset of the plurality of resources being ordered based on the modified respective relevancy scores of the second subset of the plurality of resources.

12. The computer-implemented method of claim 10, wherein the respective relevancy score for a resource of the plurality of resources is based on one or more of:
a frequency of occurrence of a search term included in the multi-factor context;
a number of occurrences of the search term in the resource; and
an amount of text in the resource.

13. The computer-implemented method of claim 12, wherein the respective relevancy score for the resource of the plurality of resources is further based on at least one of:
a data field of the resource in which the search term appears; and
a number of times the resource has been viewed.

14. The computer-implemented method of claim 10, wherein the multi-factor context includes one or more of customer context information, environment context information, and customer service process context information.

15. The computer-implemented method of claim 14, wherein the customer context information includes one or more of:
a name of a customer associated with the IT customer service issue;
a location of the customer;
services associated with the customer;
any open IT customer service tickets associated with the customer; and
any closed IT customer service tickets associated with the customer.

16. The computer-implemented method of claim 14, wherein the environment context information includes one or more of:
current known IT customer service issues;
change requests for IT services;
a product associated with the IT customer service issue; and
a service associated with the IT customer service issue.

17. The computer-implemented method of claim 14, wherein the customer service process context information includes one or more of:
- a role of an IT customer service agent working on the IT customer service issue; and
- an indication of a communication channel that is being used between the IT customer service agent and a customer associated with the IT customer service issue.

18. A computer program product tangibly embodied on a non-transitory computer-readable storage medium and including executable code that, when executed, by at least one processor is configured to cause the at least one processor to:
- receive textual input corresponding to an IT customer service issue;
- determine, based at least in part on the textual input, a multi-factor context for the IT customer service issue;
- search a plurality of resources listed in a search content to identify specific resources for resolving the IT customer service issue, the specific resources including a plurality of IT tools maintained using a tools index, and the search for the specific resources being restricted, based on the textual input and the multi-factor context, to only a limited portion of the search content, the search identifying the specific resources that are located at different places, the identified specific resources including the plurality of IT tools;
- assign, based on the multi-factor context, a respective relevancy score to each of the identified specific resources that are located at different places;
- select at least one of the plurality of IT tools, based on the tools index;
- execute the at least one of the plurality of IT tools to obtain an executed output thereof;
- as additional context information is added to the multi-factor context, including the executed output, iteratively search the search content to refine the assigned relevancy score, and update the tools index based on a result of the executed output to reflect an effectiveness of the at least one of the plurality of IT tools in resolving the IT customer service issue; and
- display, in a graphical user interface, a ranked list of the identified specific resources that are located at different places, the ranked list being ordered based on the respective relevancy scores of the identified specific resources, and an action button for launching at least one of the identified specific resources in the ranked list; and
- resolve the IT customer issue by launching the at least one of the identified specific resources in the ranked list.

19. The computer program product of claim 18, wherein the textual input corresponding with the IT customer service issue is a first input, the multi-factor context for the IT customer service issue is a first multi-factor context, and the specific resources are a first subset of the plurality of resources, the computer program product further comprising executable code that, when executed by at least one processor, is configured to cause the at least one processor to:
- receive a second input corresponding with the IT customer service issue;
- modify, based at least in part on the second input, the first multi-factor context for the IT customer service issue to determine a second multi-factor context for the IT customer issue;
- search, based on the second multi-factor context, the plurality of resources;
- modify, based on the second multi-factor context, at least one respective relevancy score of the plurality of resources; and
- display, in a graphical user interface, a ranked list of a second subset of the plurality of resources, the ranked list of the second subset plurality of resources being ordered based on the modified respective relevancy scores of the second subset of the plurality of resources.

\* \* \* \* \*